United States Patent
Oh et al.

(10) Patent No.: US 11,889,181 B2
(45) Date of Patent: Jan. 30, 2024

(54) ELECTRONIC DEVICE HAVING PLURALITY OF LENSES WHERE THE DEVICE CHANGES A VISUAL OBJECT CORRESPONDING TO A RECOMMENDED LENS

(71) Applicant: Samsung Electronics Co., Ltd., Suwon-si (KR)

(72) Inventors: Younghak Oh, Suwon-si (KR); Sunyoung Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 17/425,899

(22) PCT Filed: Jan. 15, 2020

(86) PCT No.: PCT/KR2020/000721
§ 371 (c)(1),
(2) Date: Jul. 26, 2021

(87) PCT Pub. No.: WO2020/159115
PCT Pub. Date: Aug. 6, 2020

(65) Prior Publication Data
US 2022/0191403 A1 Jun. 16, 2022

(30) Foreign Application Priority Data
Jan. 29, 2019 (KR) .......................... 10-2019-0010874

(51) Int. Cl.
*H04N 23/63* (2023.01)
*G06T 7/73* (2017.01)
(Continued)

(52) U.S. Cl.
CPC ............. *H04N 23/632* (2023.01); *G06T 7/74* (2017.01); *G06V 10/751* (2022.01); *H04N 23/62* (2023.01); *H04N 23/64* (2023.01); *G06T 2200/24* (2013.01)

(58) Field of Classification Search
CPC ...... H04N 23/632; H04N 23/62; H04N 23/64; H04N 23/60; H04N 23/90; G06T 7/74;
(Continued)

(56) References Cited

U.S. PATENT DOCUMENTS 9,716,825 B1 * 7/2017 Manzari ................. H04N 23/62
9,794,441 B2 10/2017 Eom et al.
(Continued)

FOREIGN PATENT DOCUMENTS

KR 10-2011-0074288 A 6/2011
KR 10-2015-0141808 A 12/2015
(Continued)

OTHER PUBLICATIONS

Korean Office Action dated May 12, 2023, issued in Korean Patent Application No. 11-2019-0010874.

*Primary Examiner* — Usman A Khan
(74) *Attorney, Agent, or Firm* — Jefferson IP Law, LLP

(57) ABSTRACT

Disclosed is an electronic device comprising: a display which outputs a screen; a camera module including a plurality of lenses including a first lens; a processor; and a memory. The electronic device may output, through the display, a screen including a lens selection user interface, which includes a plurality of visual objects respectively corresponding to the plurality of lenses, and a first image obtained using the first lens, and may output a lens recommendation object representing a recommendation lens among the plurality of lenses. Various other embodiments that are derived from the specification are also possible.

13 Claims, 14 Drawing Sheets

(51) Int. Cl.
*G06V 10/75* (2022.01)
*H04N 23/62* (2023.01)
*H04N 23/60* (2023.01)

(58) Field of Classification Search
CPC . G06T 2200/24; G06V 10/751; H04M 1/725; H04M 1/72403; H04M 2201/34; H04M 2201/36; H04M 2201/38; H04M 2250/22; H04M 2250/52
USPC .................................................. 348/333.03
See application file for complete search history.

(56) References Cited

U.S. PATENT DOCUMENTS

| | | | |
|---|---|---|---|
| 10,154,186 B2 | 12/2018 | Kang et al. | |
| 10,306,143 B2 | 5/2019 | Chien et al. | |
| 10,375,308 B2 | 8/2019 | Cho et al. | |
| 11,539,876 B2* | 12/2022 | Manzari | G06F 3/04842 |
| 2010/0315538 A1* | 12/2010 | Yoshitsugu | G02B 13/18 |
| | | | 348/E5.055 |
| 2013/0038759 A1* | 2/2013 | Jo | H04N 23/56 |
| | | | 348/240.99 |
| 2013/0120641 A1* | 5/2013 | Nagaoka | H04N 23/45 |
| | | | 348/345 |
| 2013/0202154 A1* | 8/2013 | Hirano | G06T 3/4038 |
| | | | 382/103 |
| 2013/0239032 A1* | 9/2013 | Hong | G06F 3/0487 |
| | | | 715/765 |
| 2014/0152875 A1* | 6/2014 | Tobin | H04N 23/635 |
| | | | 348/239 |
| 2015/0358498 A1 | 12/2015 | Eom et al. | |
| 2016/0255268 A1* | 9/2016 | Kang | H04N 23/57 |
| | | | 348/333.11 |
| 2017/0013179 A1* | 1/2017 | Kang | H04N 23/631 |
| 2017/0150062 A1* | 5/2017 | Makinen | H04N 23/62 |
| 2017/0244896 A1 | 8/2017 | Chien et al. | |
| 2018/0063431 A1 | 3/2018 | Cho et al. | |
| 2018/0063434 A1 | 3/2018 | Seol et al. | |
| 2018/0069983 A1* | 3/2018 | Cho | H04N 23/632 |
| 2018/0295292 A1* | 10/2018 | Lee | H04N 23/67 |
| 2019/0068893 A1* | 2/2019 | Kim | H04N 23/631 |
| 2021/0400206 A1* | 12/2021 | Yim | H04N 23/57 |
| 2022/0046172 A1* | 2/2022 | Lee | G06F 3/04847 |

FOREIGN PATENT DOCUMENTS

| | | |
|---|---|---|
| KR | 10-2016-0081530 A | 7/2016 |
| KR | 10-2017-0006559 A | 1/2017 |
| KR | 10-2018-0023197 A | 3/2018 |
| KR | 10-2018-0023310 A | 3/2018 |
| KR | 10-2018-0027191 A | 3/2018 |

* cited by examiner

ELECTRONIC DEVICE HAVING PLURALITY OF LENSES WHERE THE DEVICE CHANGES A VISUAL OBJECT CORRESPONDING TO A RECOMMENDED LENS

CROSS-REFERENCE TO RELATED APPLICATION(S)

This application is a U.S. National Stage application under 35 U.S.C. § 371 of an International application number PCT/KR2020/000721, filed on Jan. 15, 2020, which is based on and claims priority of a Korean patent application number 10-2019-0010874, filed on Jan. 29, 2019, in the Korean Intellectual Property Office, the disclosure of which is incorporated by reference herein in its entirety.

TECHNICAL FIELD

Embodiments of the disclosure relate to an electronic device including a plurality of lenses for the purpose of photographing an image and a technology for controlling the electronic device for the purpose of photographing an image.

BACKGROUND ART

Various electronic devices capable of photographing an image with a camera module are being supplied. The camera module may generate a signal for constructing image data by using an image sensor from a light collected through a lens. Accordingly, there is a need to use various lenses for the purpose of photographing an image under various conditions.

To make it possible to photograph an image by using various lenses, the electronic device may include a plurality of various lenses. However, unless a user is an expert in photography, it is difficult to know the best lens for photographing a subject.

DISCLOSURE

Technical Problem

Embodiments of the disclosure may provide an electronic device and a method allowing a user to easily photograph an image under an optimum condition by using at least a part of a plurality of lenses included in the electronic device.

Technical Solution

According to an embodiment of the disclosure, an electronic device may include a display that outputs a screen, a camera module that includes a plurality of lenses including a first lens, a processor, and a memory. The memory may store instructions that, when executed, cause the processor to output, through the display, a screen including a lens selection user interface including a plurality of visual objects respectively corresponding to the plurality of lenses and a first image obtained by using the first lens and to output a lens recommendation object indicating a recommendation lens of the plurality of lenses.

According to an embodiment of the disclosure, a method of controlling an electronic device including a plurality of lenses may include outputting a screen including a lens selection user interface including a plurality of visual objects respectively corresponding to the plurality of lenses and a first image obtained through a first lens of the plurality of lenses, obtaining a second image through a second lens of the plurality of lenses, and outputting, on the screen, a lens recommendation object indicating a recommendation lens determined based on the first image and the second image, in a state where the second image is not output.

According to an embodiment of the disclosure, a storage medium may store a computer program that causes an electronic device to output a screen including a lens selection user interface including a plurality of visual objects respectively corresponding to a plurality of lenses and a first image obtained through a first lens of the plurality of lenses, to obtain a second image through a second lens of the plurality of lenses, and to output, on the screen, a lens recommendation object indicating a recommendation lens determined based on the first image and the second image, in a state where the second image is not output.

Advantageous Effects

According to embodiments of the disclosure, a method and an electronic device for allowing a user to easily perceive a lens appropriate to photograph a subject may be provided.

Besides, a variety of effects directly or indirectly understood through this disclosure may be provided.

With regard to description of drawings, the same or similar components will be marked by the same or similar reference signs.

MODE FOR INVENTION

Hereinafter, various embodiments of the disclosure may be described with reference to accompanying drawings. However, those of ordinary skill in the art will recognize that modification, equivalent, and/or alternative on various embodiments described herein can be variously made without departing from the scope and spirit of the disclosure.

Figure 1:
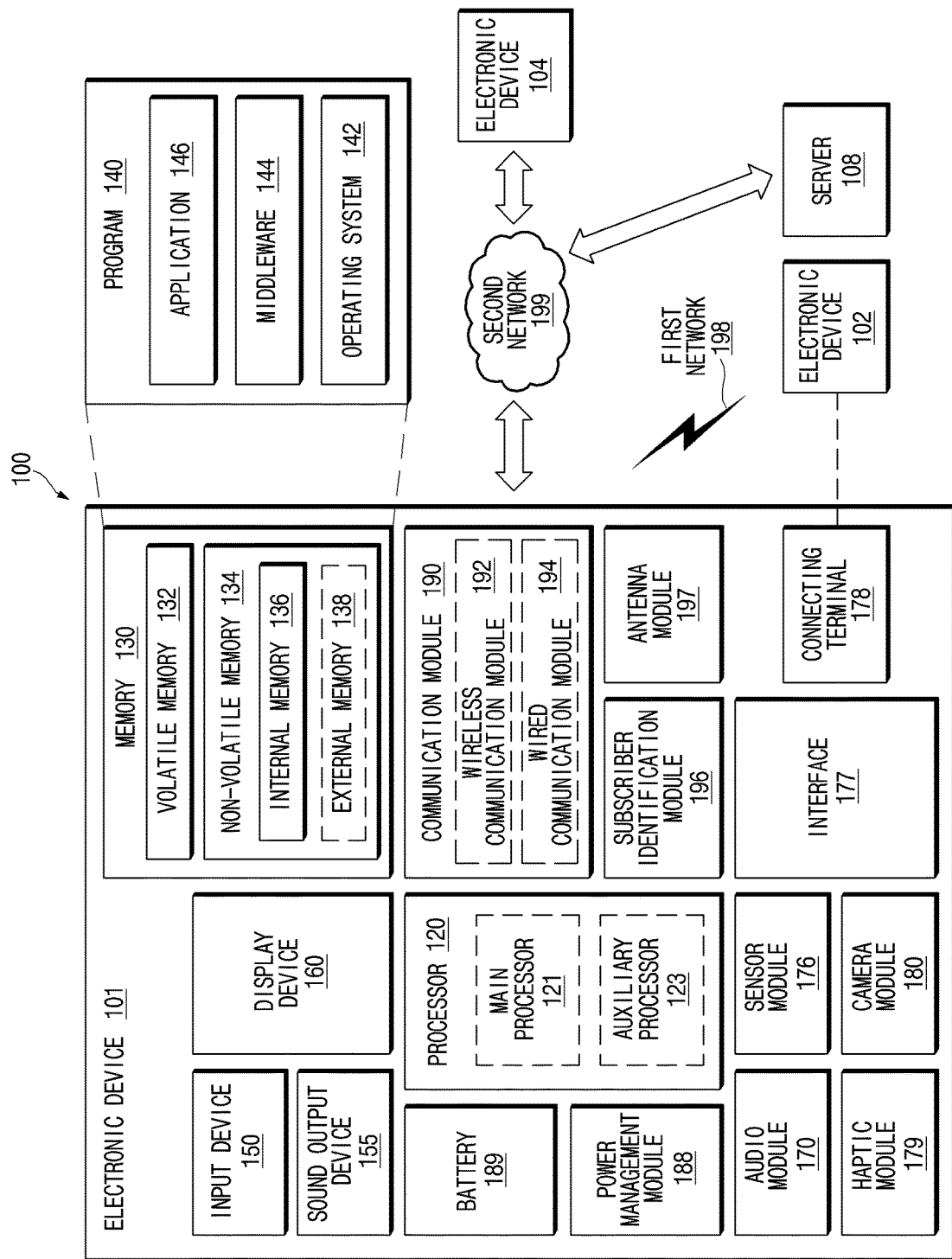
FIG. 1 illustrates an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
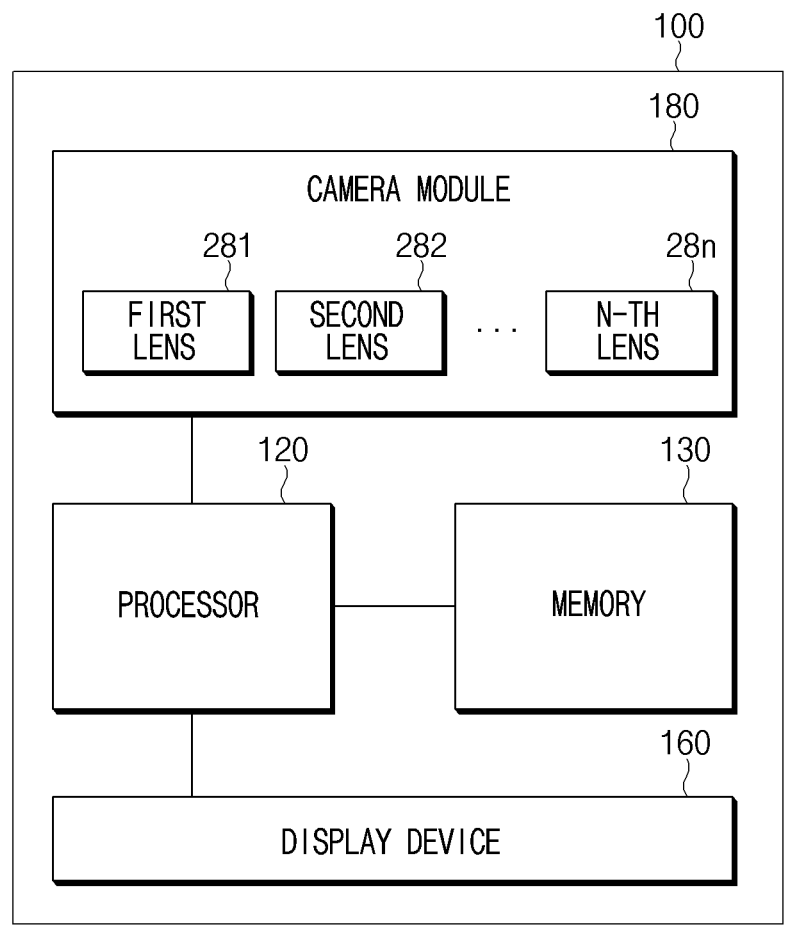
FIG. 2 illustrates a configuration of an electronic device, according to an embodiment.

FIG. 2 illustrates a configuration of an electronic device 101, according to an embodiment.

According to an embodiment, the electronic device 101 may include the processor 120, the memory 130, the display device 160, and the camera module 180. The processor 120 may execute instructions stored in the memory 130 to control components of the electronic device 101 and to process data.

According to an embodiment, the camera module 130 may include a plurality of lenses 281, 282 . . . 28n. Under control of the processor 120, the camera module 130 may generate a signal for sensing a light collected by using the plurality of lenses 281, 282 . . . 28n and generating an image.

The processor 120 may output the image, which is generated by using at least one of the plurality of lenses 281, 282 . . . 28n, through the display device 160. For example, in the case where a camera application for image photographing is executed, the processor 120 may output an image, which is generated by using the first lens 281, as a preview image for image photographing. According to an embodiment, the display device 160 may include a display for the purpose of outputting a screen including an image. In the case of receiving a user input of commanding image photographing, the processor 120 may store image data constituting the image output on the screen in the memory 130. Here, the image data that are stored in the memory 130 may include at least one of a still image or a video image.

According to an embodiment, the processor 120 may further output a lens selection user interface, which includes visual objects corresponding to the plurality of lenses 281, 282 . . . 28n, through the display device 160. For example, a visual object may mean an object, which the user is capable of visually perceiving, such as an icon. The user may perceive a visual object output through the display device 160, and may input, to the electronic device 101, a user command selecting at least one of the plurality of lenses 281, 282 . . . 28n by using the perceived visual object.

Also, the processor 120 may output a lens selection user interface, which further includes a lens recommendation object recommending at least one of the plurality of lenses 281, 282 . . . 28n, through the display device 160. According to an embodiment, the lens recommendation object means an output of the electronic device 101, which allows the user to identify and perceive a visual object corresponding to a recommended lens from among the visual objects corresponding to the plurality of lenses 281, 282 . . . 28n. For example, the lens recommendation object may be an image displayed around a visual object corresponding to a recommended lens. For another example, to output the lens recommendation object may mean to output a color of a visual object corresponding to a recommended lens so as to be distinguished from a color of any other visual object. For another example, an electronic device may output a voice capable of identifying a recommended object through a sound output device (e.g., 155 of FIG. 1).

According to an embodiment, the processor 120 may obtain respective images through the plurality of lenses 281, 282 . . . 28n and may perform image recognition on each of the obtained images for the purpose of determining a recommendation lens. Here, the processor 120 may perform image recognition on an image (e.g., a second image obtained through the second lens 282) obtained through any other lens, as well as an image (e.g., a first image obtained through the first lens 281) output as a preview image through the display device 160.

The processor 120 according to an embodiment may output, through the display device 160, a screen including a lens recommendation object indicating a recommendation lens determined based on a result of the image recognition. For example, in the case where a person's face is recognized from an image, the processor 120 may determine a lens appropriate for portrait photography as a recommendation lens; in the case where an image is recognized as an image obtained by photographing a landscape, the processor 120 may determine a lens appropriate for landscape photography as a recommendation lens.

According to another embodiment, the processor 120 may automatically change settings for image photography of the electronic device 101 so as to photograph an image by using the determined recommendation lens; however, to allow the user to photograph an image as intended, the electronic device 101 according to an embodiment may display a lens recommendation object and may not automatically change settings for image photography.

An embodiment in which a plurality of preview images generated by using the plurality of lenses 281, 282 . . . 28n are output together is possible. However, because the electronic device 101 that the user carries to photograph an image is limited in size, the user may be inconvenient to perceive a plurality of images at the same time. For this reason, the electronic device 101 according to an embodiment may display the lens selection user interface that briefly displays information for selecting a lens together with preview images generated by using some lenses.

Figure 3:
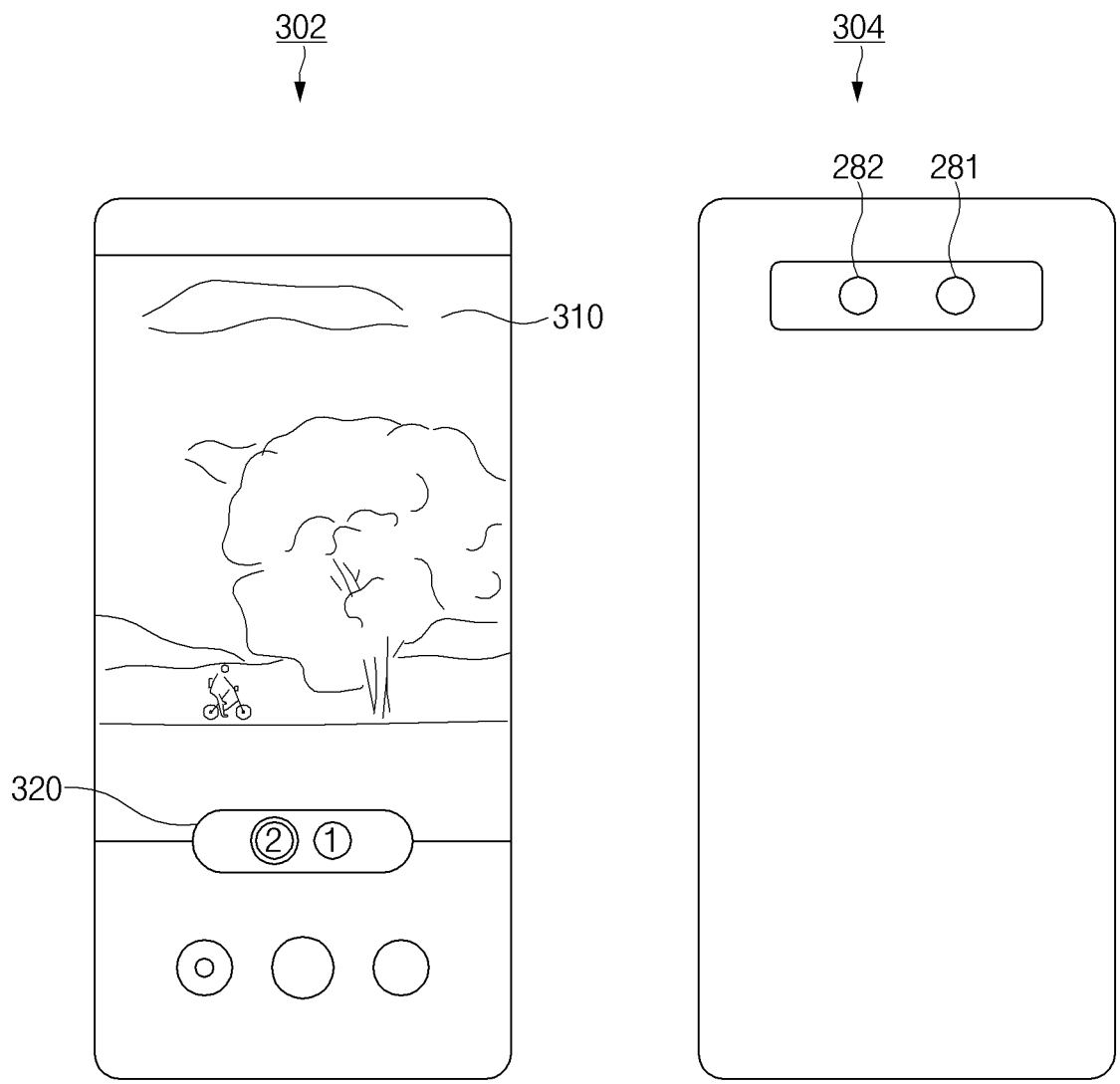
FIG. 3 is a view briefly illustrating an appearance of an electronic device, according to an embodiment.

FIG. 3 is a view briefly illustrating an example of an appearance and an output screen of the electronic device 101, according to an embodiment. Also, FIG. 3 illustrates the appearances of a front surface 302 and a rear surface 304 of the electronic device 101.

Referring to FIG. 3, the electronic device 101 may include the first lens 281 and the second lens 282. The electronic device 101 may select a lens, which will photograph a preview image 310, depending on a user command or stored settings for photography. In the case wherein the user inputs a photographing command through the preview image 310 output through a display device (e.g., 160 of FIG. 2), the user may in advance check an image to be stored.

According to an embodiment, the electronic device 101 may further output a lens selection user interface 320 including two visual objects corresponding to the first lens 281 and the second lens 282 included therein. According to an embodiment, the lens selection user interface 320 may display information about at least one of a list of selectable lenses, a lens selected to obtain the preview image 310, and a recommendation lens.

Figure 4:
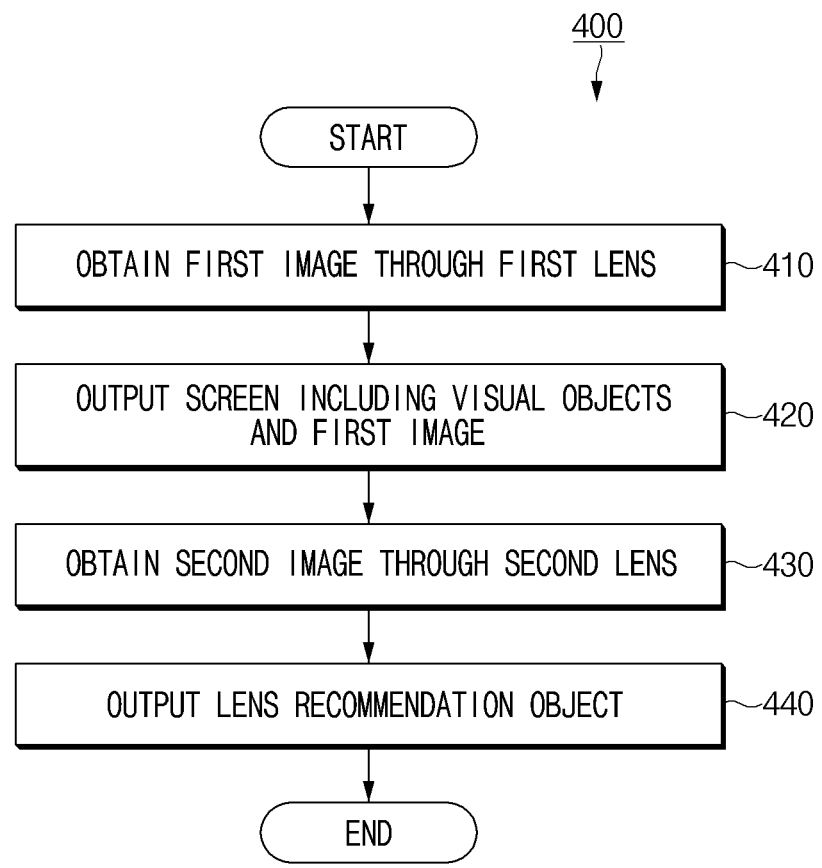
FIG. 4 is a flowchart illustrating a process of controlling an electronic device, according to an embodiment.

FIG. 4 is a flowchart 400 illustrating a process of controlling the electronic device 101, according to an embodiment.

First, the electronic device 101 may perform operation 410 of obtaining a first image through a first lens of a plurality of lenses included in the electronic device 101. Here, the first lens may be determined based on a user command or settings stored in the electronic device 101.

Afterwards, the electronic device 101 may perform operation 420 of outputting a screen including a preview image generated based on the first image and visual objects corresponding to the plurality of lenses included in the electronic device 101.

Also, the electronic device 101 may perform operation 430 of obtaining an image (e.g., a second image) through another lens (e.g., a second lens) other than the first lens among the plurality of lenses included in the electronic device 101. For convenience of description, operation 430 is illustrated in FIG. 4 as being performed after operation 420, but operation 430 may be performed in parallel with operation 410 and operation 420 depending on an embodiment.

Afterwards, the electronic device 101 may perform operation 440 of outputting a lens recommendation object indicating a recommendation lens determined based on the obtained images (e.g., the first image and the second image). Afterwards, when a user command that directs a change of a lens to be used to photograph an image is input from the user, the electronic device 101 may change a lens to be used to photograph an image from the first lens to another lens (e.g., the second lens) depending on the user command.

Figure 5:
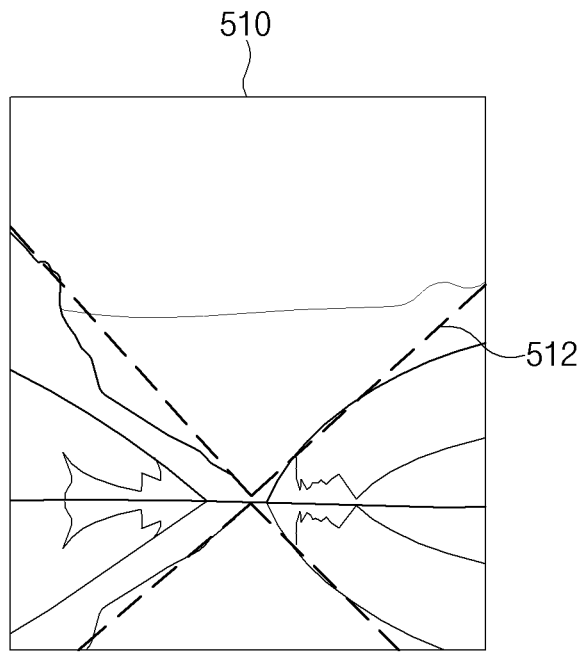
FIG. 5 illustrates an example for describing a method in which an electronic device selects a recommendation lens, according to an embodiment.
Figure 5:
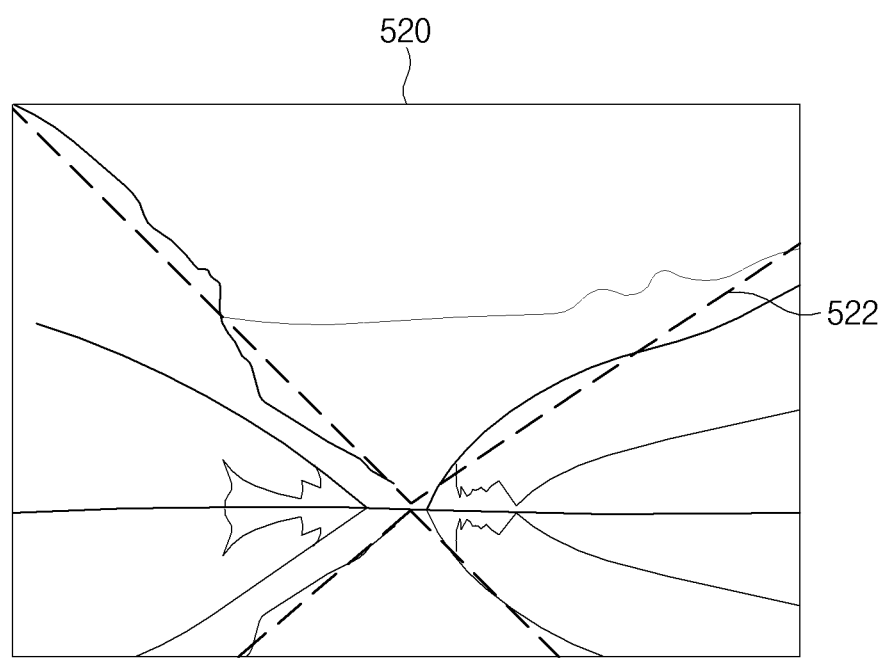

FIG. 5 illustrates an example for describing a method in which the electronic device 101 selects a recommendation lens, according to an embodiment.

FIG. 5 shows an example of a first image 510 obtained by using a first lens with a relatively narrow horizontal view angle and a second image 520 obtained by using a second lens with a relatively wide horizontal view angle.

Referring to FIG. 5, according to an embodiment, the electronic device 101 may extract edges from the first image 510 and the second image 520, respectively. Also, comparing a first trend line 512 and a second trend line 522 that are determined from the extracted edges, because the first image 510 fails to sufficiently include a subject compared to the second image 520, the electronic device 101 may determine the second lens as a recommendation lens.

Figure 6:
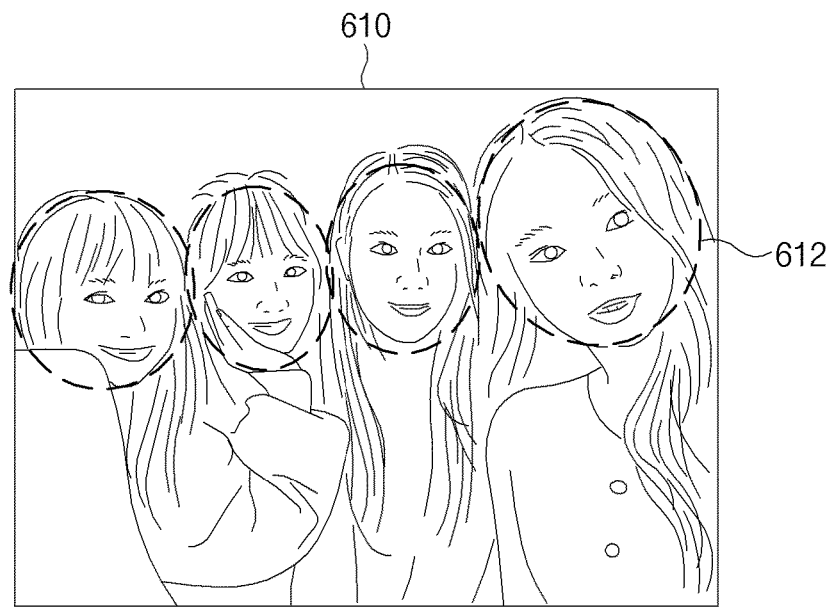
FIG. 6 illustrates an example for describing a method in which an electronic device selects a recommendation lens, according to an embodiment.
Figure 6:
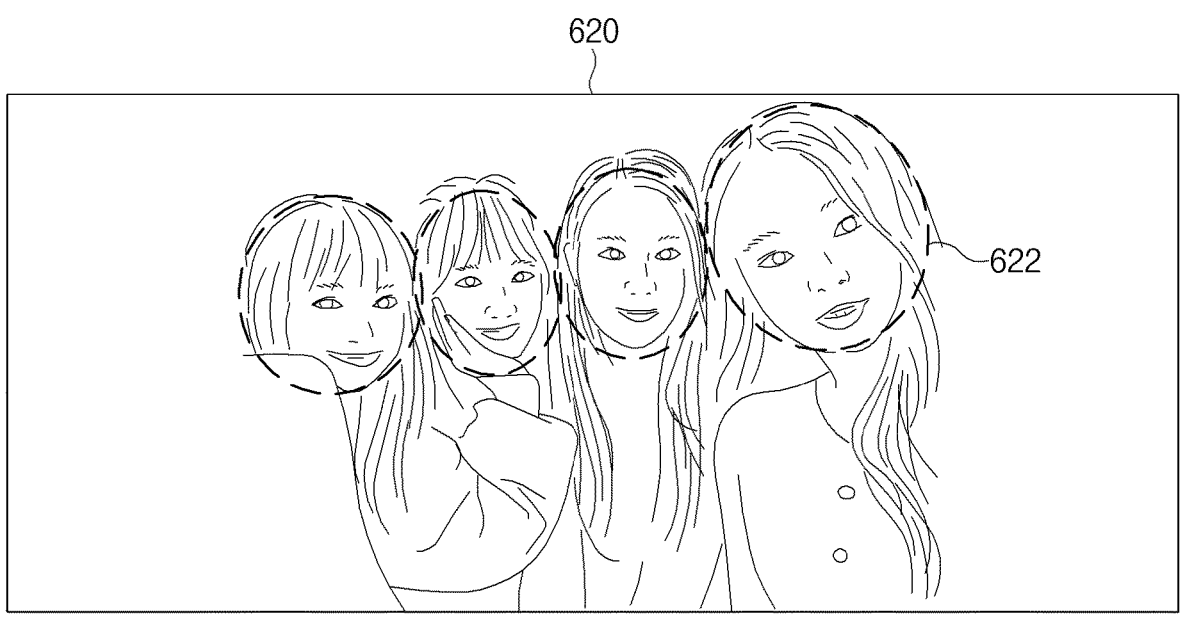

FIG. 6 illustrates an example for describing a method in which an electronic device selects a recommendation lens, according to an embodiment.

FIG. 6 shows an example of a first image 610 obtained by using a first lens with a relatively narrow horizontal view angle and a second image 620 obtained by using a second lens with a relatively wide horizontal view angle.

According to an embodiment, when one or more face objects 612 and 622 having human face features are recognized from photographed images, the electronic device 101 may determine a recommendation lens from lenses through which the images including the one or more objects 612 and 622 are photographed.

Alternatively, when both the first image 610 and the second image 620 include a face object, the electronic device 101 may determine the first lens photographing the first image 610, in which an unnecessary white space (or margin) is less included, as a recommendation lens.

However, according to some embodiments, FIGS. 5 and 6 are for describing a method of using image recognition to determine a recommendation lens; according to an embodiment, a method of determining a recommendation lens may be replaced with any other method.

Figure 7:
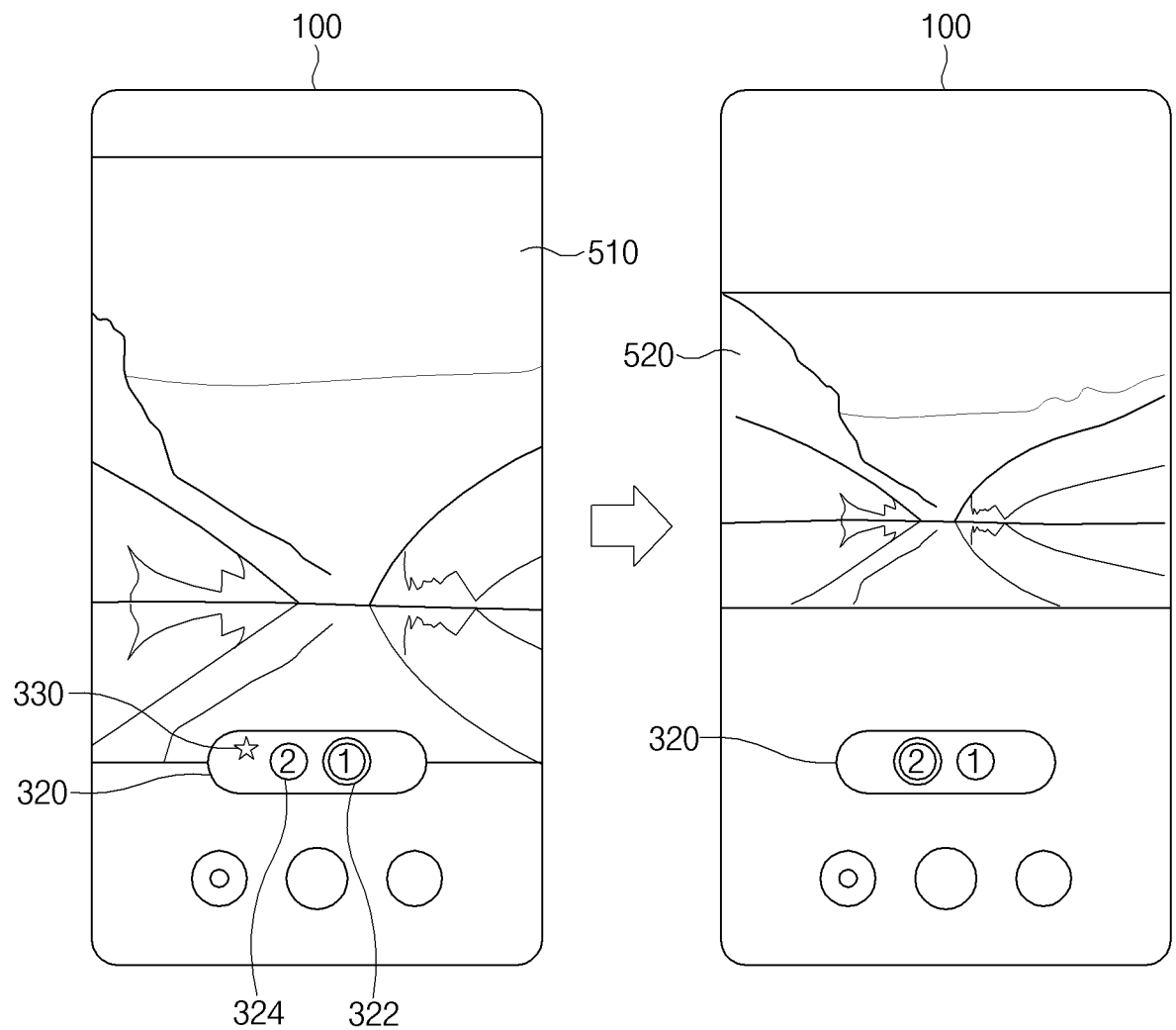
FIG. 7 illustrates an example of changing a lens selected to photograph an image, according to an embodiment.

FIG. 7 illustrates an example of changing a lens selected to photograph an image, according to an embodiment.

Referring to FIG. 7, the electronic device 101 may display a preview image 510 including an image determined by using a first lens, together with the lens selection user interface 320. According to the example illustrated in FIG. 7, the lens selection user interface 320 may include a first visual object 322 corresponding to the first lens, and a second visual object 324 corresponding to a second lens.

Also, in the case where the electronic device 101 determines the second lens as a recommendation lens, the electronic device 101 may further display a lens recommendation object 330 indicating a recommendation lens around the second visual object 324.

Afterwards, the user may input a user command selecting the second lens to the electronic device 101. For example, in the case where the electronic device 101 displays the lens selection user interface 320 through a touchscreen display, the electronic device 101 may receive a touch input to a region where the second visual object 324 is displayed. For another example, the electronic device 101 may receive a voice input such as "change a lens for photographing to a recommendation lens."

In the case where the user command selecting the second lens is input, as a response to the user input, the electronic device 101 may display a preview image 520 including an image photographed by using the second lens, instead of the preview image 510 including the image photographed by using the first lens.

Figure 8:
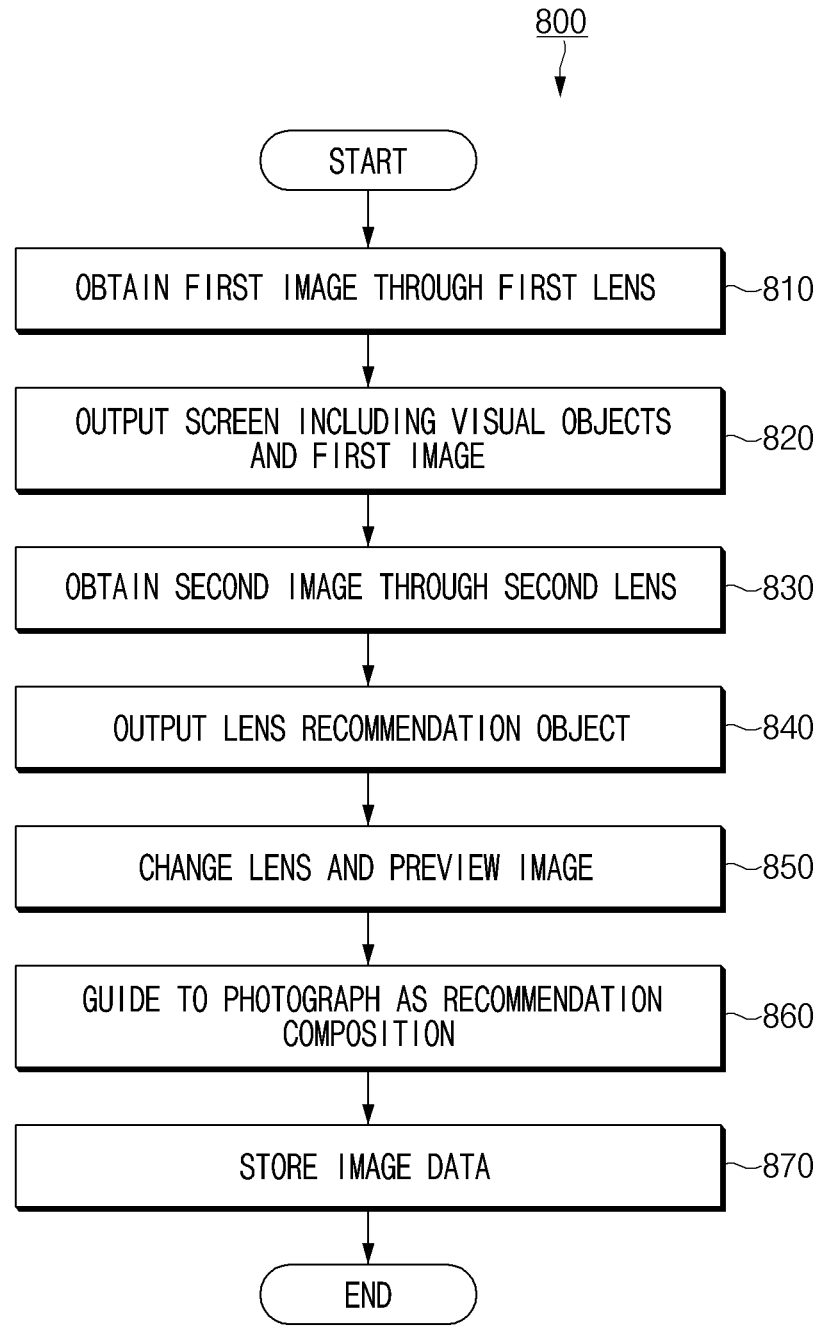
FIG. 8 is a flowchart illustrating a process of controlling an electronic device, according to an embodiment.

FIG. 8 is a flowchart illustrating a process of controlling an electronic device, according to an embodiment.

First, the electronic device 101 may perform operation 810 of obtaining a first image through a first lens of a plurality of lenses included in the electronic device 101. Here, the first lens may be determined based on a user command or settings stored in the electronic device 101.

Afterwards, the electronic device 101 may perform operation 820 of outputting a screen including a preview image generated based on the first image and visual objects corresponding to the plurality of lenses included in the electronic device 101.

Also, the electronic device 101 may perform operation 830 of obtaining an image (e.g., a second image) through another lens (e.g., a second lens) other than the first lens among the plurality of lenses included in the electronic device 101. For convenience of description, operation 830 is illustrated in FIG. 4 as being performed after operation 820, but operation 830 may be performed in parallel with operation 810 and operation 820 depending on an embodiment.

Afterwards, the electronic device 101 may perform operation 840 of outputting a lens recommendation object indicating a recommendation lens determined based on the obtained images (e.g., the first image and the second image). According to an embodiment, the electronic device 101 may determine a recommendation lens by using a recommendation composition. The electronic device 101 according to an embodiment may determine a recommendation composition from one or more recommendation compositions stored in a memory (e.g., the memory 130 of FIG. 1) depending on a kind of an object recognized from the obtained images. Here, a recommendation composition may be data including feature information about an image. The electronic device 101 may determine the degrees by which features extracted from the obtained images correspond to the determined recommendation composition. The electronic device 101 may determine, as a recommendation lens, a lens used to photograph an image in which the degree corresponding to the recommendation composition is high.

Afterwards, when a user command that directs a change of a lens to be used to photograph an image is input from the user, the electronic device 101 may perform operation 850 of changing a lens to be used to photograph an image from the first lens to another lens (e.g., the second lens) depending on the user command and changing a preview image based on the changed lens.

Afterwards, the electronic device 101 may perform operation 860 of guiding the user to photograph an image depending on the recommendation composition by using the changed lens. For example, there may be output a photographing guidance object for guiding the user to move or rotate the electronic device 101. Here, the photographing guidance object may be implemented in various forms capable of being output by the electronic device 101. For example, the photographing guidance object may include an augmented reality object to be displayed on a preview image or a sound to be output through a speaker.

Afterwards, when a photographing command directing a save of image data is input, the electronic device 101 may perform operation 870 of storing an image obtained through the selected lens in a memory (e.g., the memory 130 of FIG. 1) as image data. According to an embodiment, the photographing command may be a user input of selecting an image photographing button. Alternatively, according to another embodiment, in the case where the image obtained through the selected lens satisfies a condition corresponding to the recommendation composition, the electronic device 101 may automatically determine that the photographing command is input.

Figure 9:
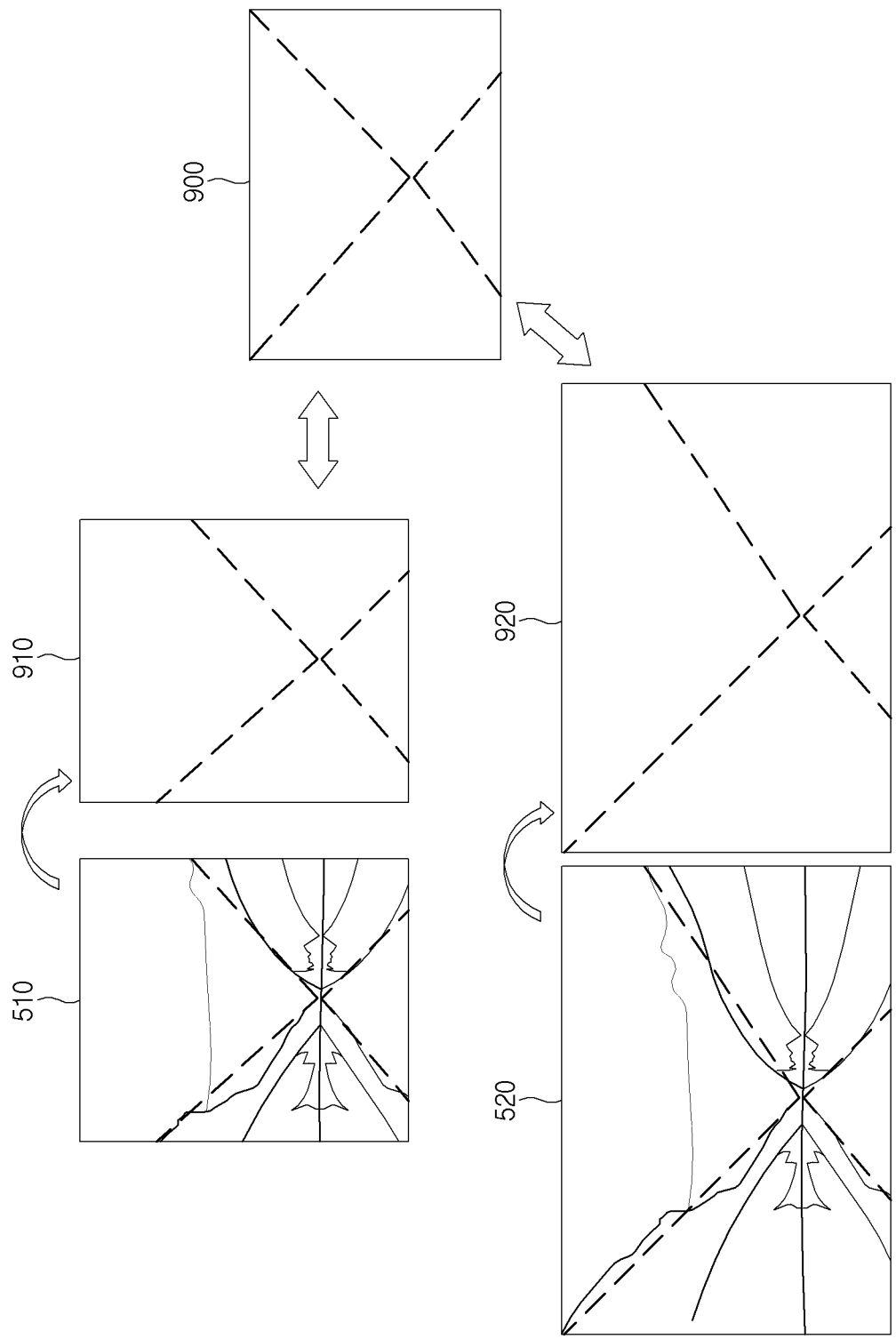
FIG. 9 illustrates an example for describing a method in which an electronic device selects a recommendation lens, according to another embodiment.

FIG. 9 illustrates an example for describing a method in which the electronic device 101 selects a recommendation lens by using a recommendation composition, according to another embodiment.

Referring to FIG. 9, the electronic device 101 may extract feature information 910 and 920 from images (e.g., the first image 510 and the second image 520) obtained by using a plurality of lenses, respectively.

Afterwards, the electronic device 101 may compare each of the extracted feature information 910 and 920 with feature information included in a recommendation composition 900. Depending on a result of the comparison, the electronic device 101 may calculate scores indicating the degrees by which the first image 510 and the second image 520 correspond to the recommendation composition 900. According to an embodiment, the electronic device 101 may determine a recommendation lens based on magnitudes of the calculated scores.

Figure 10:
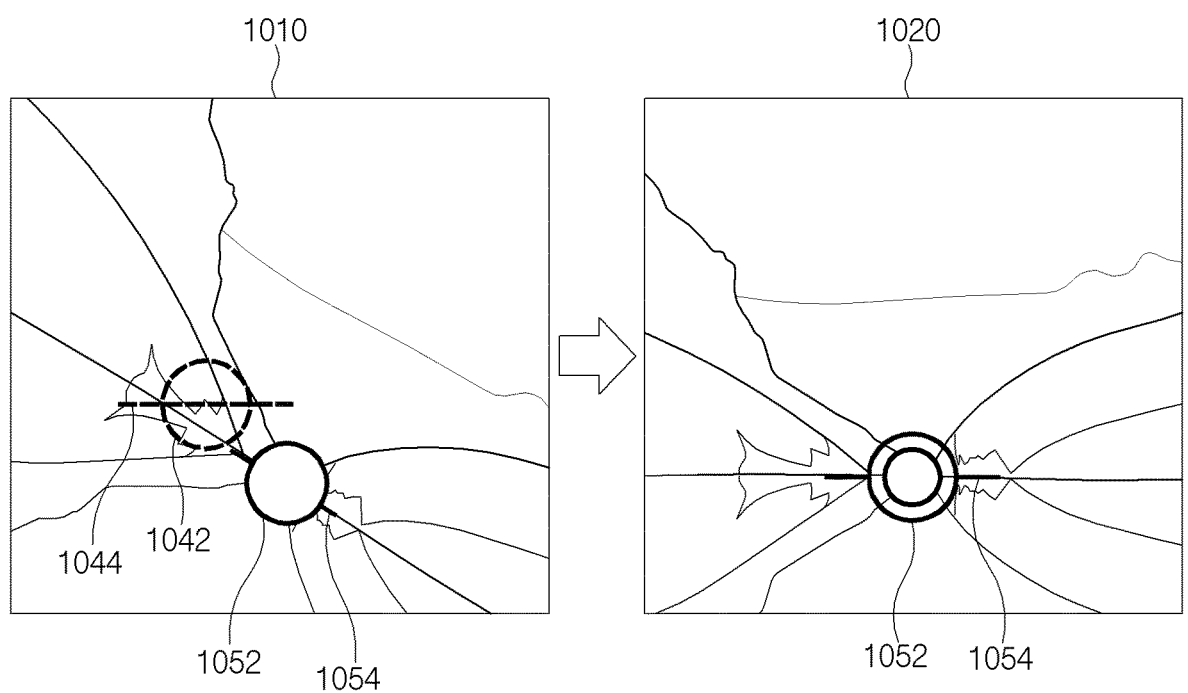
FIG. 10 illustrates an example for describing a method in which an electronic device guides to photograph an image depending on a recommendation composition, according to an embodiment.

FIG. 10 illustrates an example for describing a method in which the electronic device 101 guides to photograph an image depending on a recommendation composition, according to an embodiment.

An electronic device according to an embodiment may perform operation (e.g., 860 of FIG. 8) of guiding the user to photograph an image depending on a recommendation composition. According to an embodiment, to guide the user to photograph an image depending on a recommendation composition, the electronic device 101 may overlap, on a preview image, a reference image indicating a reference location and a feature point indication image indicating a tracked feature location of a photographed subject.

According to an embodiment, the reference location may include at least one of coordinates and a direction (e.g., a horizontal direction) in an image frame, which are associated with the feature point of the subject to be located depending on the recommendation composition. For example, referring to FIG. 10, the reference image indicating the reference location may include a location indication object 1042 to be displayed at a fixed location in a screen 1010 and a direction indication object 1044 indicating a direction.

Also, the feature location of the subject may mean a location that is determined by the photographed subject and has a feature corresponding to a feature of the reference location in the recommendation composition. For example, referring to FIG. 10, a feature point image may include a location indication object 1052 indicating a location of the feature point of the subject and a direction indication object 1054 indicating a direction. In the case where an image of a subject in a frame moves or rotates along a movement or a rotation of the electronic device 101 or a lens, at least one of the location indication object 1052 and the direction indication object 1054 may move or rotate along the subject.

According to an embodiment, in the case where the user moves a lens and thus a feature point of a subject moves to a reference location, the electronic device 101 may display the object 1052 indicating that a location of the subject on a screen 1020 coincides with a location of a recommendation composition and the object 1054 indicating that a direction of the subject coincides with a direction of the recommendation composition.

Figure 11:
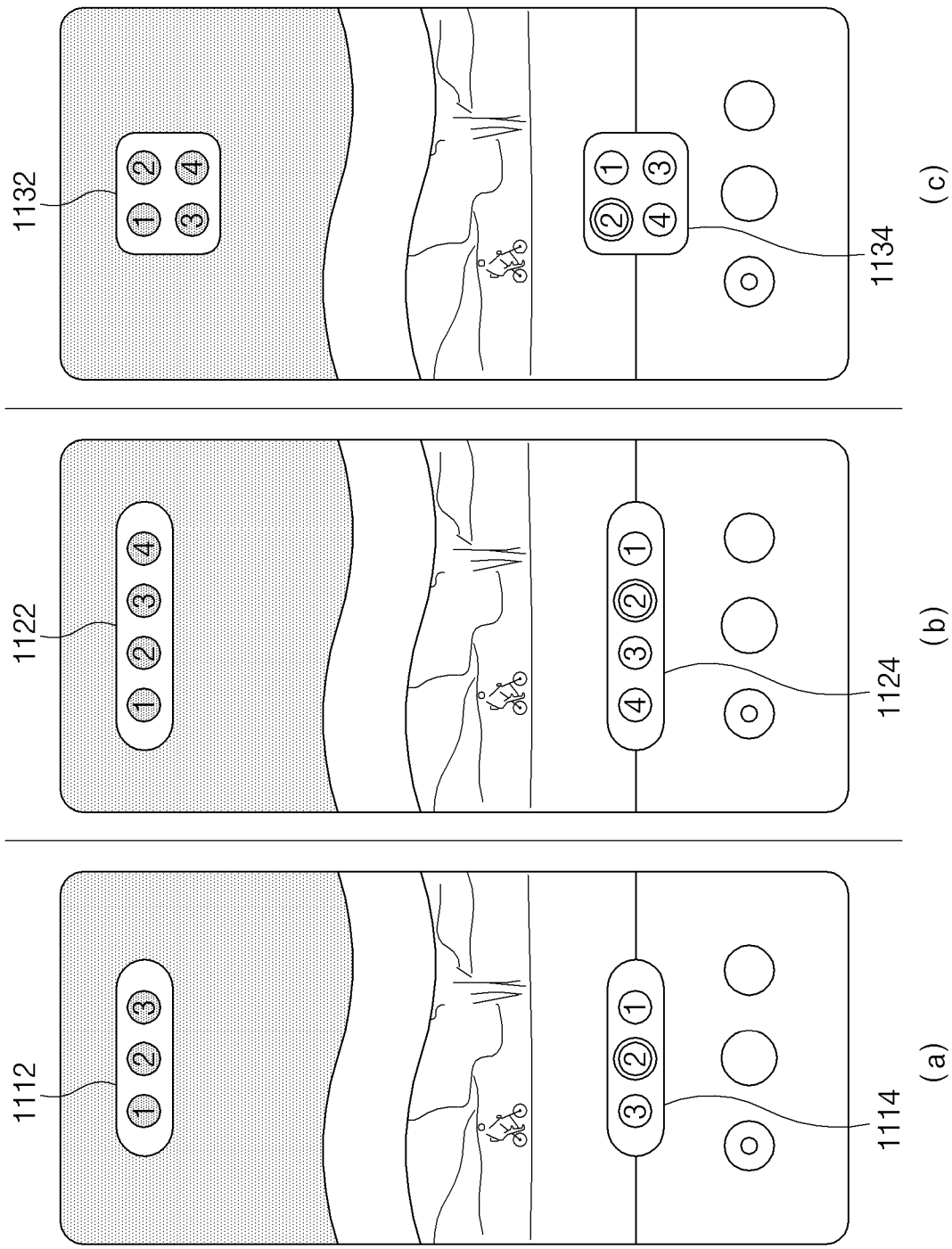
FIG. 11 illustrates examples of lens selection user interfaces in which visual objects are arranged, according to various embodiments.

FIG. 11 illustrates examples of lens selection user interfaces in which visual objects are arranged, according to various embodiments.

According to an embodiment, the electronic device 101 may construct a lens selection user interface depending on a configuration of lenses included in the electronic device 101.

For example, the electronic device 101 may display a lens selection user interface including visual objects, the number of which corresponds to the number of lenses available for photographing.

For example, referring to (a) of FIG. 11, in the case where the electronic device 101 includes three rear lenses 1112 disposed to photograph substantially the same direction, the electronic device 101 may display a lens selection user interface 1114 including three visual objects respectively corresponding to the lenses. In contrast, referring to (b) of FIG. 11, in the case where the electronic device 101 includes four rear lenses 1122 disposed to photograph substantially the same direction, the electronic device 101 may display a lens selection user interface 1124 including four visual objects respectively corresponding to the lenses.

Also, for another example, the electronic device 101 may display a lens selection user interface including visual objects disposed to correspond to a shape in which a plurality of lenses are arranged. As illustrated in (a) and (b) of FIG. 11, in the case where the lenses 1112 and 1122 are arranged in a row, the electronic device 101 may display the lens selection user interfaces 1114 and 1124 in which visual objects are arranged in a row. In contrast, in the case where the lenses 1132 are arranged in a plurality of columns, the electronic device 101 may display a lens selection user interface 1134 in which visual objects are arranged in a plurality of columns.

The electronic device 101 may allow the user to select a lens more intuitively by constructing a lens selection user interface depending on a configuration of lenses.

Also, to obtain information about a configuration of lenses included in the electronic device 101, the electronic device 101 may execute an application program interface (API) installed on the electronic device 101. The electronic device 101 may obtain information about the specifications of a plurality of lenses installed in the electronic device 101 by using the executed API. Based on the information about the specifications of the lenses thus obtained, the electronic device 101 may determine a recommendation lens or may construct a lens selection user interface.

Figure 12:
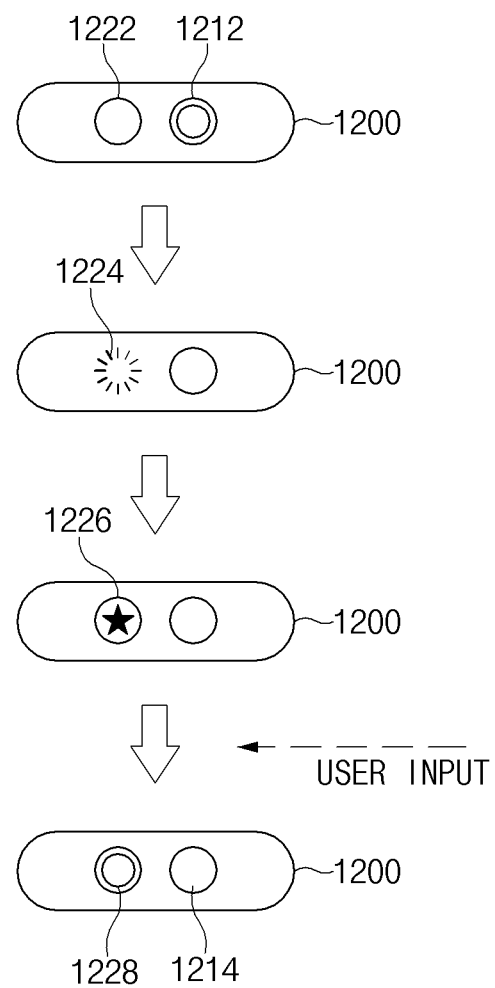
FIG. 12 illustrates an example for describing a change of a lens selection user interface displayed in the process in which an electronic device recommends a lens and changes a lens selected to photograph an image, according to an embodiment.

FIG. 12 illustrates an example for describing a change of a lens selection user interface 1200 displayed in the process in which the electronic device 101 recommends a lens and changes a lens selected to photograph an image, according to an embodiment.

First, in the case where the electronic device 101 including a first lens and a second lens executes an application for photographing an image, the electronic device 101 may display the lens selection user interface 1200 including a first visual object 1212 corresponding to the first lens and a second visual object 1222 corresponding to the second lens. Also, according to an embodiment, in the case where a lens to be used to obtain a first image to be displayed in a display is the first lens, the electronic device 101 may display the first visual object 1212 corresponding to the selected first lenses so as to be distinguished from the second visual object 1222.

Also, the electronic device 101 may obtain a second image through the second lens and may perform image recognition on the second image. While the second image is obtained through the second lens or an image recognition process is performed on the second image, the second visual object 1222 may be expressed as an image 1224 indicating that the image obtained through the second lens is under image analysis.

In the case where the second lens is determined as a recommendation lens as a result of performing the image recognition process, the electronic device 101 may display a lens recommendation object 1226 at a location of the second visual object 1222.

Afterwards, in the case where the electronic device 101 receives a user input of selecting the lens recommendation object 1226, the electronic device 101 may express the second visual object 1222 as an image 1228 indicating that a lens is selected. Also, the electronic device 101 may express the first visual object 1212 as an image 1214 indicating that a lens is not selected.

Figure 13:
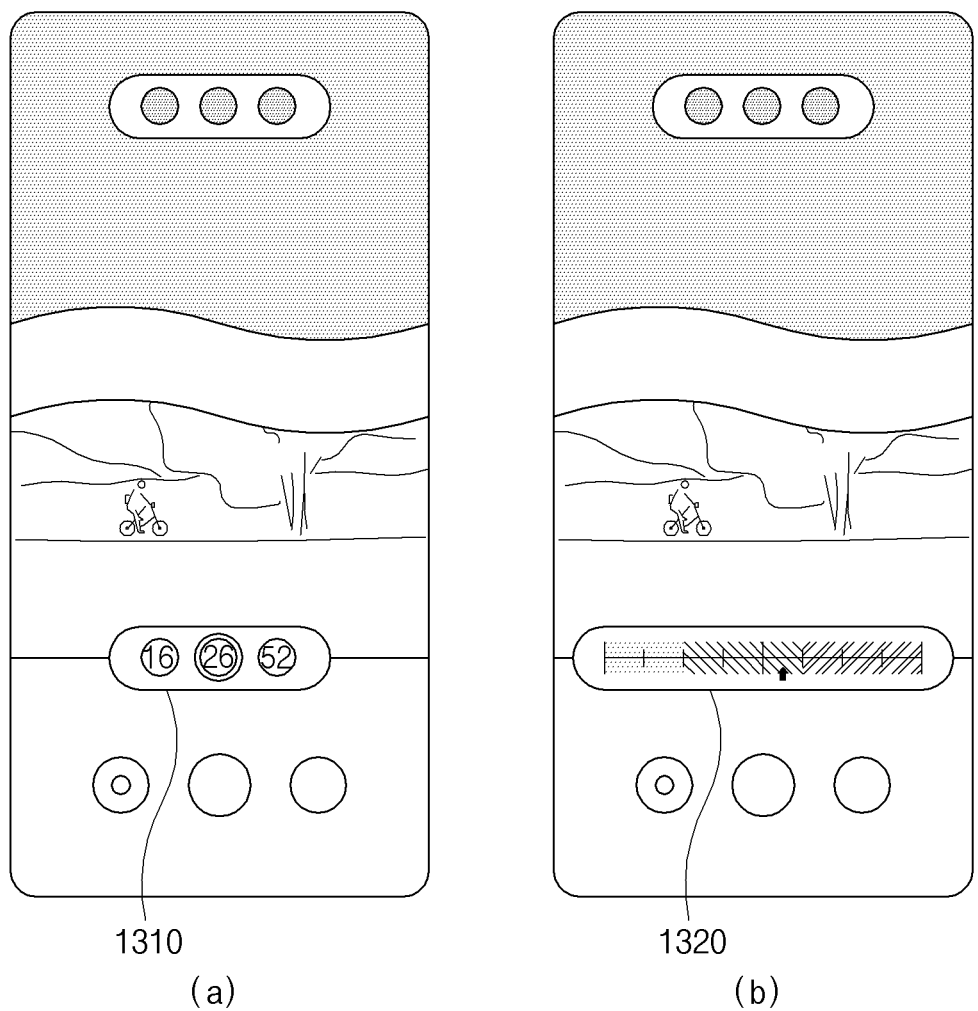
FIG. 13 illustrates examples of lens selection user interfaces, according to various embodiments.

FIG. 13 illustrates examples of lens selection user interfaces, according to various embodiments.

A lens selection user interface may be implemented in various forms depending on embodiments.

For example, referring to (a) of FIG. 13, the electronic device 101 may display a lens selection user interface 1310 including an icon corresponding to a lens and a visual object in which a text expressing information about a lens is combined. The information about the lens may include, for example, a focal length of a lens corresponding to a visual object. According to an embodiment, the electronic device 101 may obtain information about a lens stored in the memory 130 by using an API installed thereon. Alternatively, the electronic device 101 may obtain information capable of identifying the electronic device 101 or a lens and may search an external server for the information about the lens by using the obtained information.

For another example, referring to (b) of FIG. 13, a lens selection user interface may be implemented in the form of a slide bar 1320. When the user selects a desired setting value by using the slide bar 1320, the electronic device 101 may select a lens having the specifications corresponding to the setting value.

Figure 14:
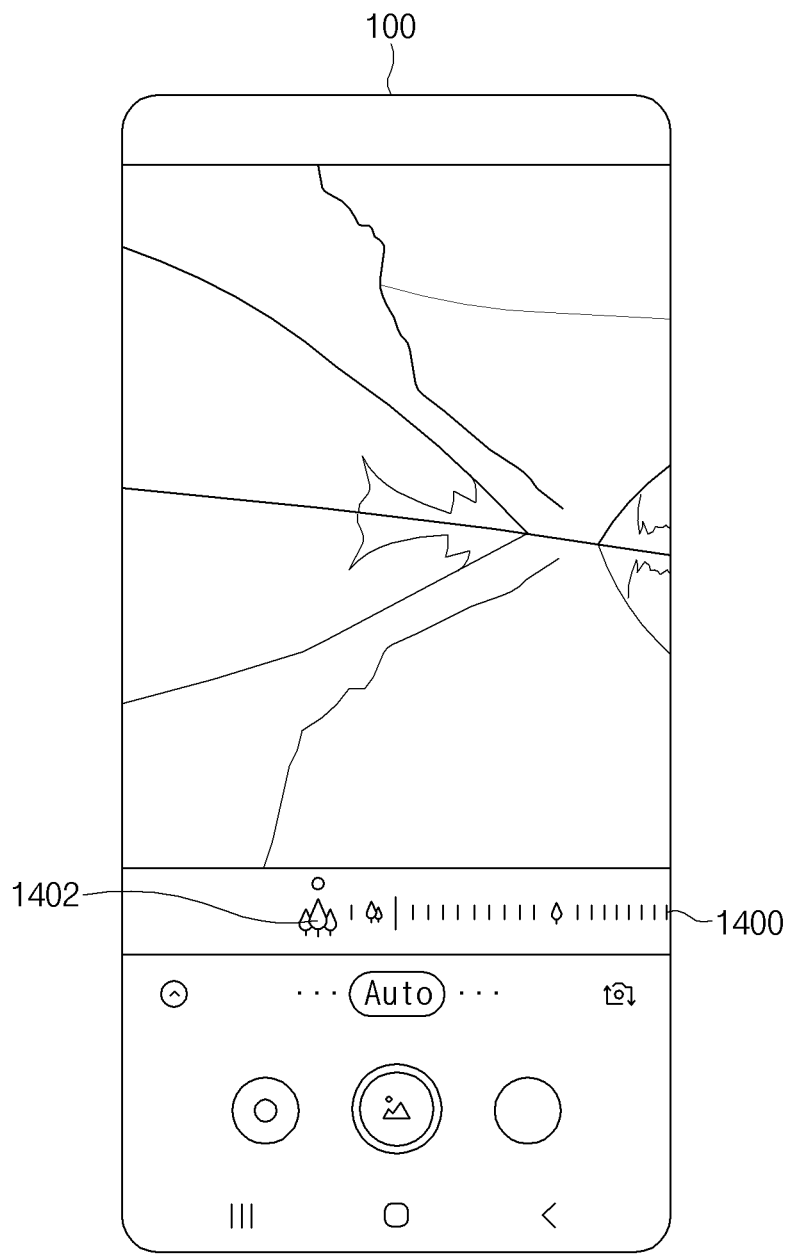
FIG. 14 illustrates an example of a lens selection user interface, according to another embodiment.

FIG. 14 illustrates an example of a lens selection user interface, according to another embodiment.

According to another embodiment, the electronic device 101 may recommend a lens depending on a zoom in/zoom out operation associated with image photographing. In the case of receiving a zoom in command or a zoom out command, the electronic device 101 adjusts a magnification associated with image photographing. Here, the electronic device 101 may recommend an appropriate lens depending on the magnification associated with image photographing.

For example, in the case where a second lens is determined as a lens more appropriate for the zoom in or zoom out operation in a state where an image obtained through a first lens is being output as a preview image, the electronic device 101 may display a lens recommendation object recommending the second lens.

Alternatively, the electronic device 101 may recommend a lens by using a slide bar 1400 that slides depending on a magnification changed by the zoom in or zoom out operation. Referring to FIG. 14, a visual object 1402 indicating each lens included in the electronic device 101 may be disposed on the slide bar 1400 depending on a magnification order (e.g., an ultra wide lens, a wide lens, and a tele lens) so as to move along a movement of the slide bar 1400. The visual object 1402 may be displayed on a screen of the electronic device 101 or may disappear, while moving along the slide bar 1400. When the visual object 1402 is displayed on the screen, the user may perceive that the corresponding lens is a lens recommended in a current magnification state and may input a user input of selecting the visual object 1402 to the electronic device 101. The electronic device 101 that receives the user command selecting the visual object 1402 may change a lens corresponding to the visual object 1402 to a lens for photographing an image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a display configured to output a screen;
    a camera comprising a plurality of lenses arranged in a designated direction;
    a processor; and
    a memory,
    wherein the memory stores instructions that, when executed, cause the processor to:
        output, through the display, a first image obtained by using a first lens of the plurality of lenses,
        output, through the display, a user interface comprising a plurality of visual objects respectively corresponding to the plurality of lenses,
        display a first visual object corresponding to the first lens to be distinguished from other visual objects in a state of outputting the user interface and the first image,
        determine one of the plurality of lenses as a recommended lens, and
        change a visual object corresponding to the recommended lens among the plurality of visual objects,
    wherein the plurality of visual objects are arranged to correspond to the designated direction on the display.

2. The electronic device of claim 1,
    wherein the display comprises a touch panel, and
    wherein the instructions further cause the processor to:
        in response to a touch input to a second visual object corresponding to a second lens of the plurality of lenses, from among the plurality of visual objects, being received through the touch panel, output a second image obtained by using the second lens instead of the first image.

3. The electronic device of claim 1,
    wherein the instructions further cause the processor to:
        obtain a second image by using a second lens of the plurality of lenses;
        perform image recognition on the first image being outputted on the display and the second image outputted on the display; and
        determine the recommendation lens based on a result of the image recognition.

4. The electronic device of claim 3, wherein the instructions further cause the processor to:
    compare degrees by which the first image and a second image correspond to a recommendation composition, and
    select the recommendation lens based on a result of the comparison.

5. The electronic device of claim 4, wherein the instructions further cause the processor to:
    in response to the recommendation lens being the first lens, perform guidance based on the result of the comparison such that a feature location recognized from the first image corresponds to a reference location included in the recommendation composition.

6. The electronic device of claim 5, wherein the instructions further cause the processor to:
    further display a reference image indicating the reference location and a feature point indication image indicating the feature location tracked in the first image.

7. The electronic device of claim 6, wherein the instructions further cause the processor to:
    in response to a location of the feature point indication image being within a reference region including the reference location, store image data corresponding to the first image in the memory.

8. The electronic device of claim 1, wherein the instructions further cause the processor to:
    obtain information about specifications of the plurality of lenses by executing an application program interface (API) installed on the electronic device, and
    determine the recommendation lens based on the information about the specifications.

9. A method of controlling an electronic device including a plurality of lenses arranged in a designated direction, the method comprising:
    outputting a first image obtained by using a first lens of the plurality of lenses;
    outputting user interface including a plurality of visual objects respectively corresponding to the plurality of lenses;
    displaying a first visual object corresponding to the first lens to be distinguished from other visual objects in a state of outputting the user interface and the first image;
    obtaining a second image through a second lens of the plurality of lenses;
    determining one of the plurality of lenses as a recommended lens based on the first image and the second image, in a state where the first image is output and the second image is not output; and
    changing a visual object corresponding to the recommended lens among the plurality of visual objects.

10. The method of claim 9, further comprising:
    receiving an input of selecting a second visual object corresponding to the second lens, from among the plurality of visual objects; and
    outputting the second image obtained by using the second lens instead of the first image, as a response to the received input.

11. The method of claim 9, wherein the determining one of the plurality of lenses as a recommended lens comprises:
  performing image recognition on the first image and the second image; and
  determining the recommendation lens based on a result of the image recognition.

12. The method of claim 9, wherein the determining one of the plurality of lenses as a recommended lens comprises:
  comparing degrees by which the first image and the second image obtained by using the second lens correspond to a recommendation composition; and
  determining the recommendation lens based on a result of the comparison.

13. The method of claim 12, further comprising:
  in response to the recommendation lens being the first lens, guiding photographing based on the result of the comparison such that a feature location recognized from the first image corresponds to a reference location included in the recommendation composition.

\* \* \* \* \*